United States Patent [19]

Nakao et al.

[11] Patent Number: 4,462,607
[45] Date of Patent: Jul. 31, 1984

[54] RECLINING MECHANISM FOR BABY CARRIAGE

[75] Inventors: Shinroku Nakao, Kanagawa; Kouichi Kobayashi, Tokyo, both of Japan

[73] Assignee: Combi Co., Ltd., Tokyo, Japan

[21] Appl. No.: 308,719

[22] Filed: Oct. 5, 1981

[30] Foreign Application Priority Data

Oct. 6, 1980 [JP] Japan .......................... 55-142430[U]

[51] Int. Cl.³ ............................................. B62B 7/06
[52] U.S. Cl. ....................................... 280/644; 24/196; 280/650; 280/47.4; 297/457
[58] Field of Search ............... 280/642, 644, 650, 658, 280/47.4; 297/284, 353, 441, 457; 24/196, 198, 200, 195, 197

[56] References Cited

U.S. PATENT DOCUMENTS

| 131,155 | 9/1872 | Eibee | 297/457 |
|---|---|---|---|
| 2,549,841 | 4/1951 | Morrow | 24/196 |
| 2,781,225 | 2/1957 | Heideman | 280/642 |
| 2,803,864 | 8/1957 | Bishaf | 24/196 |
| 2,807,852 | 10/1957 | Rave | 24/197 |
| 2,853,757 | 9/1958 | Rave | 24/197 |
| 3,192,586 | 7/1965 | Marley | 24/196 |
| 3,813,734 | 6/1974 | Schauweker | 24/200 |
| 3,998,490 | 12/1976 | Lallave | 297/457 |
| 4,171,555 | 10/1979 | Bakker | 24/200 |

Primary Examiner—David M. Mitchell
Attorney, Agent, or Firm—Sughrue, Mion, Zinn, Macpeak & Seas

[57] ABSTRACT

The upper back portion of a seating sheet is suspended from the handle of a baby carriage by a slidable clip arrangement including a first loop clip suspended from the carriage handle and a second loop clip adjustably secured to the upper portion of the seating sheet.

1 Claim, 4 Drawing Figures

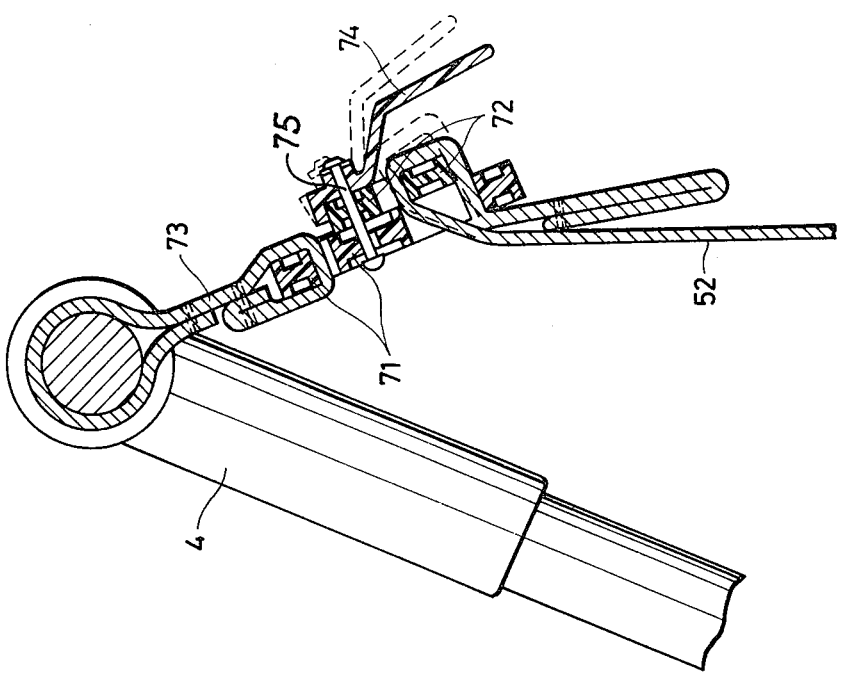
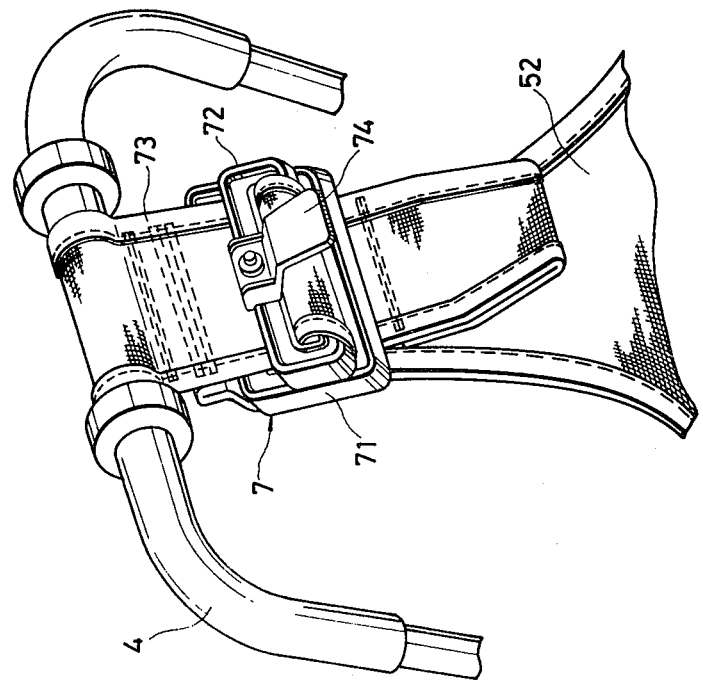

RECLINING MECHANISM FOR BABY CARRIAGE

BACKGROUND OF THE INVENTION

This invention relates to the reclining mechanisms of baby carriages, and more particularly to a reclining mechanism utilizing a seating sheet laid on a baby carriage.

A baby carriage, especially a so-called "baby buggy" which is so designed that the angle of inclination of the seat or the back can be changed, have been well known for some time. In a conventional baby carriage, the baby carriage body and the frame rod assembly on which the back sheet is laid are provided separately, so that the reclination is adjusted by inclining the frame rod assembly. Because of this, the baby carriage is intricate in construction, relatively large in weight, and high in manufacturing cost.

SUMMARY OF THE INVENTION

An object of this invention is to provide a reclining mechanism for a baby carriage, which is simple in construction and in which the adjusting means for reclining are considerably simple.

Another object of this invention is to provide a reclining mechanism for a baby carriage which is lightweight and convenient to carry, and which can also be manufactured at low cost.

Briefly, these and other objects are achieved by a carriage wherein a seating sheet is suspended between a pair of side frames, the seat portion of the seating sheet being tightly strung across the side frames and the back portion of the seating sheet having a lower part which is coupled across the side frames and a tapered upper part which is adjustably suspended from the carriage handle. The adjustable suspension is carried out by means of a two-part loop clip, with one part suspended in a fixed position from the handle and the other adjustably secured to the upper part of the back portion after the latter passes through the first part.

BRIEF DESCRIPTION OF THE DRAWINGS

One embodiment of this invention will be described with reference to the accompanying drawings, in which:

FIG. 2 is an enlarged perspective view showing the essential components of the reclining mechanism;

FIG. 3 is a sectional view showing the essential components shown in FIG. 2.

DETAILED DESCRIPTION OF THE PREFERRED EMBODIMENTS

Figure 1:
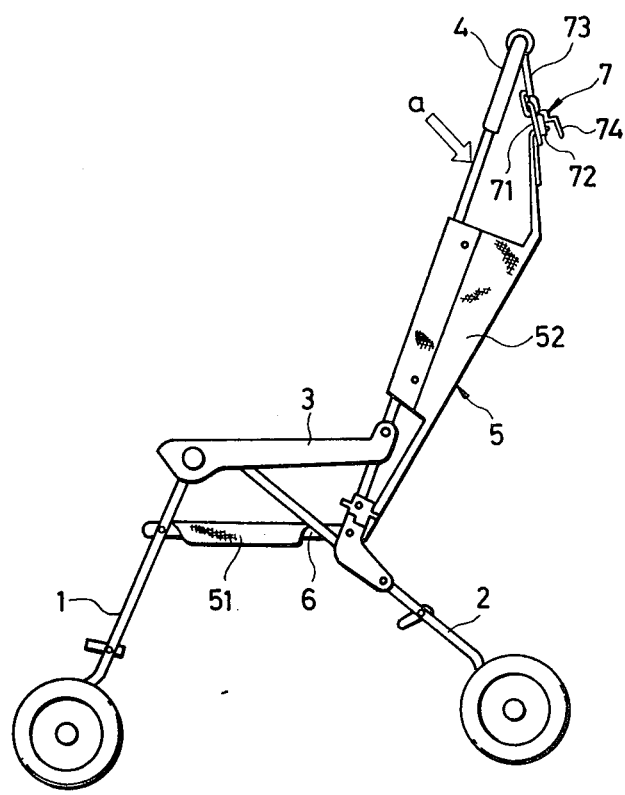
FIG. 1 is a perspective view showing a baby carriage with a reclining mechanism according to this invention.
Figure 4:
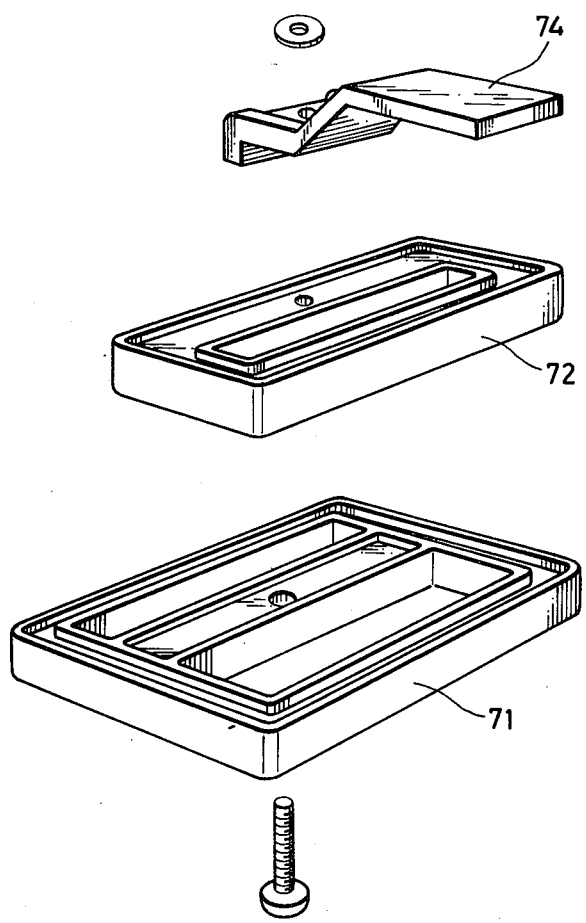
FIG. 4 is an exploded perspective view of a loop clip employed in the invention.

A baby carriage generally indicated by reference character a has in large part a conventional construction including a pair of side frames which are coupled together with cross members (not shown). Each of the side frames is made up of a front leg rod 1, a rear leg rod 2, an arm rod 3 and a hand rod 4, as shown in FIG. 1. A seating sheet 5 has a portion 51 on which a baby sits (hereinafter referred to as "a seat portion 51", when applicable). Both sides of the seat portion 51 are fixedly secured to seat rods 6, and both sides of the lower half of the back portion 52 are fixedly secured to a pair of side frames extending from the hand rods 4. The upper part of the back portion 52 in inserted into a loop clip 7 to adjust the length of the upper part. The loop clip 7 is made up of a stationary loop 71 and a slidable loop 72. The stationary loop 71 is fixedly secured to a supporting band 73 suspended from the assembly of hand rods 4 (hereinafter referred to as "a hand rod assembly" when applicable). The stationary loop 71 is provided with an aperture through which the top end of the back portion 52 extends. The top end of the back portion 52 extends about the slidable loop 72 and passes back through the aperture as best seen in FIG. 3. The slidable loop 72 is larger than the aperture in the stationary loop through which the top end of the back portion 52 passes as best seen in FIGS. 2 and 4. Thus, the slidable loop 72 cannot pass through the aperture in the stationary loop 71 and the top end of the back portion 52 will be clamped in adjusted position between the stationary loop 71 and the slidable loop 72. The loop clip 7 has a knob 74 for operating the slidable loop 72. The knob or lever 74 may be tilted from the solid line portion to the phantom line portion in FIG. 3 to release the end of the back portion 52 for adjustment about loop 72. The lever 74, loop 72 and loop 71 are all held loosely together by a common shaft 75. It is desirable that the width of the back portion 52 is gradually decreased towards the top end. Furthermore, it is desirable that the top end portion of the back portion 52 is folded in two as shown in FIG. 3, so that it may not come off the stationary loop 71 and the slidable loop 72.

With the reclining mechanism of this invention constructed as described above, when the upper part of the back portion 52 of the seating sheet 5, which has been inserted into the loop clip 7, is pulled as in the case of pulling a belt tied around the waist, the back portion 52 is raised substantially along the hand rods 4. On the other hand, if the slidable loop 72 of the loop clip 7 is loosened to release the upper half of the back portion 52 to thereby move the locking position of the upper part, then the inclination angle of the back portion 52 is increased accordingly. Thus, the baby can be readily allowed to recline on the baby carriage. That is, the baby carriage with the reclining mechanism according to this invention, unlike that having the conventional reclining mechanism, is advantageous in that it is completely unnecessary to carry out a troublesome operation wherein the frame rods or the links supporting the frame rods must be stretched. With the mechanism according to the present invention, it is only necessary to lift up on the knob 74.

Furthermore, according to this invention, the reclining mechanism is so designed that the reclining operation can be achieved by changing the locking position of the seating sheet 5, more specifically the locking position of the back portion 52 at which the latter 52 is locked to the loop clip 7. Therefore, continuous adjustment of the reclining angle is possible. This is another significant advantage of this invention.

What is claimed is:

1. A baby carriage comprising a pair of side frames coupled at their upper ends by a hand rod, a seating sheet coupled on either side to said side frames, said seating sheet including a seat portion on which a baby sits and a back position on which a baby reclines, said back portion including a lower part and an upper part with the lower part of said back portion being coupled on either side to said side frames, and slidable connection means coupling the upper part of said back portion to said hand rod; said slidable connection means comprising a stationary loop having an aperture therein suspended from said hand rod, a slidable loop larger than said aperture adjustably secured to said upper part of said back portion, said upper part of said back portion extending in a first direction through said aperture in said stationary loop, around a portion of said slidable loop and back through said stationary loop aperture in an opposite direction and a separate lever operatively associated with said slidable loop for moving said portion of said slidable loop away from said stationary loop to thereby permit an adjustment of the position of the upper part relative to said slidable loop whereby the reclining angle of said back portion may be adjusted, said stationary loop, said slidable loop and said lever each having overlaying portions with aligned apertures for loosely receiving a common shaft, wherein said separate lever and said slidable loop are loosely secured together to said stationary loop.

* * * * *